United States Patent
Wada et al.

[15] 3,676,491
[45] July 11, 1972

[54] PROCESS FOR PREPARING TRIFLUOROACETIC ANHYDRIDE

[72] Inventors: Hiroyuki Wada, Suita-shi; Heikitsu Sonoyama, Setsu-shi, both of Japan

[73] Assignee: Daikin Kogyo Co., Ltd.

[22] Filed: June 9, 1969

[21] Appl. No.: 831,758

[30]     Foreign Application Priority Data

June 18, 1968   Japan....................44/42103

[52] U.S. Cl............................260/546, 260/544 F
[51] Int. Cl.................................................C07c 51/54
[58] Field of Search.....................................260/546

[56]            References Cited

OTHER PUBLICATIONS

Remacha, C. A. 66 65007a, 1967

*Primary Examiner*—Lorraine A. Weinberger
*Assistant Examiner*—Robert Gerstl
*Attorney*—Harry C. Bierman, Jordan B. Bierman and Bierman & Bierman

[57]            ABSTRACT

A process for preparing trifluoroacetic anhydride which comprises the steps of reacting trifluoroacetyl chloride with a metal oxide (e.g. zinc oxide, copper oxide, cadmium oxide) at a temperature from 40° to 100° C. The reaction may be carried out in an inert solvent.

16 Claims, No Drawings

PROCESS FOR PREPARING TRIFLUOROACETIC ANHYDRIDE

The present invention relates to a process for preparing trifluoroacetic anhydride.

Hitherto, trifluoroacetic anhydride has been produced by dehydration of trifluoroacetic acid with phosphoric anhydride or sulfuric anhydride. Such a process, however, has numerous disadvantages among which are a poor product yield, a relatively expensive operation and poor reaction kinetics.

It has now been found that the reaction of trifluoroacetyl chloride with a metal oxide produces trifluoroacetic anhydride in an excellent yield.

The starting material, trifluoroacetyl chloride, can be produced easily and at a low cost by means of the photooxidation of 2,3-dichlorohexafluorobutene-2, which is obtained by the chlorination and fluorination of a petrochemical byproduct.

In the method known in the art, the objective trifluoroacetic anhydride is produced from trifluoroacetic acid, wherein said acid is obtained by hydrolysis of trifluoroacetyl chloride. The process of the present invention compares very favorably with such known method in that the objective trifluoroacetic anhydride is produced directly from trifluoroacetyl chloride.

Metal oxides which may be used in the process of the present invention include zinc oxide, copper oxide, cadmium oxide, barium oxide, lead oxide. Of these, zinc oxide, copper oxide and cadmium oxide are particularly preferred from the viewpoint of their reactivity with trifluoroacetyl chloride.

Since the metal oxide is a solid, the reaction in the present process is a liquid-solid or gas-solid reaction. The reaction temperature is varied depending on the type of metal oxide used. It is usually between 40° to 100° C. Although the reaction can proceed at a temperature outside of said range, a temperature lower than 40° C will suppress the reaction rate while a temperature higher than 100° C will result in reduced economy.

No limitation is present as regards the amount of trifluoroacetyl chloride and metal oxide to be employed. However, the use of excess trifluoroacetyl chloride is preferred in order to react all of the metal oxide, and thereby facilitating the separation or recovery of trifluoroacetic anhydride from the reaction mixture.

In carrying out the process of this invention a solvent which is inert to the reagents such as chlorofluorohydrocarbons (e.g. 1,1,2,2-tetrafluorodichloroethane) and ethers (e.g. ether, dioxane) may be used as the reaction medium. This allows for improved heat transfer during the course of the reaction.

The reaction in the present process is generally carried out in an autoclave as a batch wise process. It may, however, be also carried out continuously.

The separation and recovery of the trifluoroacetyl chloride (B.P. $-19°$ C) and the product trifluoroacetic anhydride (B.P. $40°$ C) from the reaction mixture can be readily accomplished by distillation. The separation and recovery of each of the reagent metal oxides and the byproduct metal chlorides may be effected by a method which is based on their solubility differences in water.

Practical and presently preferred embodiments of the present invention are illustratively shown in the following examples.

EXAMPLE 1

Into a stainless steel autoclave (300 ml volume) equipped with an agitator, zinc oxide (6 g) is admitted. The autoclave is cooled with Dry Ice to $-40°$ C, and trifluoroacetyl chloride (20 g) is charged therein. Then, the autoclave is heated in an electric furnace at 40° C for 9 hours with continuous agitation. After completion of the reaction, the valve of the autoclave is opened, and the reaction product is collected in a trap cooled with Dry Ice. By gas chromatography and an infrared absorption spectrum, the production of trifluoroacetic anhydride (11 g) is confirmed.

EXAMPLE 2

Into a stainless steel autoclave (300 ml volume) equipped with an agitator, cupric oxide (5 g) is admitted. The autoclave is cooled with Dry Ice to $-40°$ C, and trifluoroacetyl chloride (14 g) is charged therein. Then, the autoclave is heated in an electric furnace at 80° C for 7 hours with continuous agitation. After completion of the reaction, the valve of the autoclave is opened, and the reaction product is collected in a trap cooled with Dry Ice. By gas chromatography and an infrared absorption spectrum, the production of trifluoroacetic anhydride (7 g) is confirmed.

EXAMPLE 3

Into a stainless steel autoclave (300 ml volume) equipped with an agitator, cadmium oxide (7 g) is admitted. The autoclave is cooled with Dry Ice to $-40°$ C, and trifluoroacetyl chloride (15 g) is charged therein. Then, the autoclave is heated in an electric furnace at 45° C for 6 hours with continuous agitation. After completion of the reaction, the valve of the autoclave is opened, and the reaction product is collected in a trap cooled with Dry Ice. By gas chromatography and an infrared absorption spectrum, the production of trifluoroacetic anhydride (6 g) is confirmed.

What is claimed is:

1. A process for preparing trifluoroacetic anhydride which comprises the step of reacting at elevated pressure trifluoroacetyl chloride with a metal oxide selected from the group consisting of zinc oxide, copper oxide and cadmium oxide at a temperature from 40° C to 100° C.

2. The process according to claim 1, wherein excess trifluoroacetyl chloride is used based on the metal oxide.

3. The process according to claim 1, wherein the reaction is carried out in an inert solvent.

4. The process according to claim 3, wherein said inert solvent is an ether or a chlorofluoro hydrocarbon.

5. The process according to claim 1, wherein the reaction is carried out batchwise.

6. The process according to claim 1, wherein the reaction is carried out continuously.

7. A process for preparing trifluoroacetic anhydride which comprises the steps of reacting at elevated pressure trifluoroacetyl chloride with zinc oxide at a temperature from 40° to 100° C and distilling the reaction mixture to recover the produced trifluoroacetic anhydride.

8. The process according to claim 7, wherein the reaction is carried out in an inert solvent.

9. The process according to claim 7, wherein excess trifluoroacetyl chloride is used based on the zinc oxide.

10. A process for preparing trifluoroacetic anhydride which comprises the steps of reacting at elevated pressure trifluoroacetyl chloride with cupric oxide at a temperature from 40° to 100° C and distilling the reaction mixture to recover the produced trifluoroacetic anhydride.

11. The process according to claim 10, wherein the reaction is carried out in an inert solvent.

12. The process according to claim 10, wherein excess trifluoroacetyl chloride is used based on the cupric oxide.

13. A process for preparing trifluoroacetic anhydride which comprises the steps of reacting at elevated pressure trifluoroacetyl chloride with cadmium oxide at a temperature from 40° to 100° C and distilling the reaction mixture to recover the produced trifluoroacetic anhydride.

14. The process according to claim 13, wherein the reaction is carried out in an inert solvent.

15. The process according to claim 13, wherein excess trifluoroacetyl chloride is used based on the cadmium oxide.

16. A process for preparing trifluoroacetic anhydride which comprises the steps of reacting at elevated pressure trifluoroacetyl chloride with a metal oxide selected from the group consisting of zinc oxide, copper oxide, cadmium oxide, barium oxide and lead oxide at a temperature from 40° to 100° C.

* * * * *